United States Patent
Scharmüller et al.

(10) Patent No.: US 9,522,581 B2
(45) Date of Patent: Dec. 20, 2016

(54) DRAWBAR

(71) Applicants: Josef Scharmüller, Fornach (AT); Josef Scharmüller, Jr., Fornach (AT)

(72) Inventors: Josef Scharmüller, Fornach (AT); Josef Scharmüller, Jr., Fornach (AT)

(*) Notice: Subject to any disclaimer, the term of this patent is extended or adjusted under 35 U.S.C. 154(b) by 0 days.

(21) Appl. No.: 14/761,540

(22) PCT Filed: Jan. 15, 2014

(86) PCT No.: PCT/AT2014/000008
§ 371 (c)(1),
(2) Date: Jul. 16, 2015

(87) PCT Pub. No.: WO2014/110609
PCT Pub. Date: Jul. 24, 2014

(65) Prior Publication Data
US 2015/0360527 A1    Dec. 17, 2015

(30) Foreign Application Priority Data
Jan. 17, 2013  (AT) .................... A 35/2013

(51) Int. Cl.
*B60D 1/02* (2006.01)
(52) U.S. Cl.
CPC ...................... *B60D 1/02* (2013.01)
(58) Field of Classification Search
CPC ....................................... B60D 1/02
USPC  280/477, 515, 504, 507, 495, 511; 403/315, 316, 317; 70/232; 172/678, 679
See application file for complete search history.

(56) References Cited

U.S. PATENT DOCUMENTS

| | | | | |
|---|---|---|---|---|
| 2,654,613 A * | 10/1953 | Blair | .................. | B60D 1/02 280/490.1 |
| 4,783,094 A * | 11/1988 | Sands | ................ | B60D 1/28 172/677 |
| 4,944,525 A * | 7/1990 | Landry | ................ | B60D 1/40 280/479.2 |
| 7,338,062 B1 * | 3/2008 | Violette | ................ | B60D 1/40 280/478.1 |
| 2003/0167806 A1 | 9/2003 | Witchey | | |
| 2007/0145719 A1 | 6/2007 | Heitlinger | | |
| 2010/0201100 A1 * | 8/2010 | Hill | ................ | B60D 1/02 280/477 |

(Continued)

FOREIGN PATENT DOCUMENTS

| | | |
|---|---|---|
| CA | 2418830 | 5/2003 |
| CA | 2647211 | 7/2010 |

(Continued)

OTHER PUBLICATIONS

International Search Report issued by the European Patent Office in International Application PCT/AT2014/000008.

*Primary Examiner* — Jacob Knutson
(74) *Attorney, Agent, or Firm* — Henry M. Feiereisen LLC.

(57) ABSTRACT

A drawbar for a towing vehicle includes a longitudinal support and an attachment which is removably fixed to the longitudinal support. The longitudinal support and the attachment form a towing-eye receiving area, and the longitudinal support and the attachment each have a receiving opening for a coupling pin. The attachment has at least one tilting protrusion which is arranged in a recess of the longitudinal support in a self-locking manner relative to a removal force in the direction of the central line of the coupling pin.

9 Claims, 1 Drawing Sheet

(56) References Cited

U.S. PATENT DOCUMENTS

2010/0283225 A1* 11/2010 Lahn ..................... B60D 1/06
280/506

FOREIGN PATENT DOCUMENTS

DE          4041838     6/1992
EP          1795383     6/2007

* cited by examiner

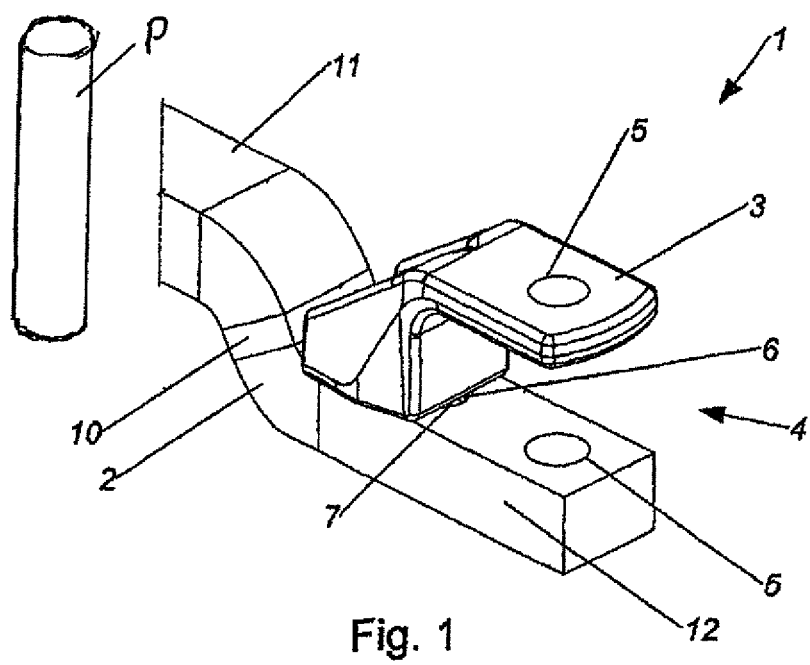
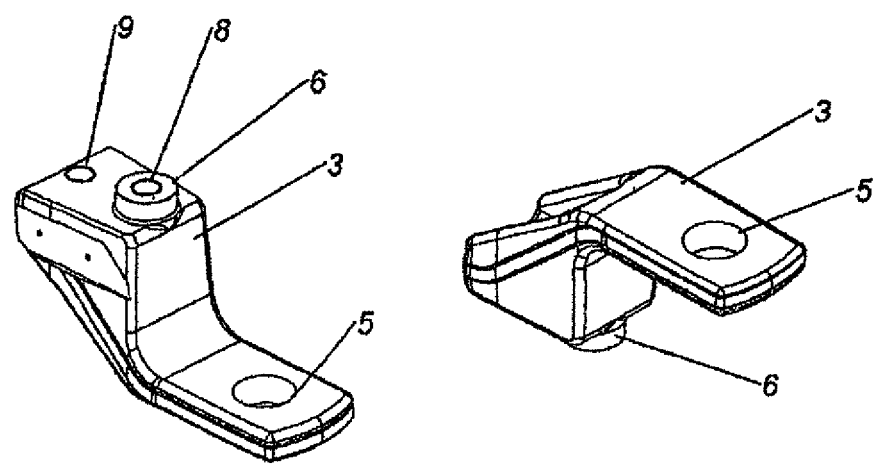

DRAWBAR

CROSS-REFERENCES TO RELATED APPLICATIONS

This application is the U.S. National Stage of International Application No. PCT/AT2014/000008, filed Jan. 15, 2014, which designated the United States and has been published as International Publication No. WO 2014/110609 and which claims the priority of Austrian Patent Application, Serial No. A 35/2013, filed Jan. 17, 2013, pursuant to 35 U.S.C. 119(a)-(d).

BACKGROUND OF THE INVENTION

The invention relates to a drawbar.

A drawbar is a hitch apparatus which is especially used in agricultural tractor vehicles. A drawbar is often used for hitching simple agricultural trailers by means of a so-called bottom hitch. The drawbar comprises a longitudinal support, which is arranged in a horizontally pivotably manner on the rear of the agricultural tractor vehicle. An attachment is usually fixed to the longitudinal support, which forms a drawbar eye receiver together with the longitudinal support, wherein a drawbar of the trailer can pivotably be fastened by means of a coupling pin in the drawbar eye receiver. A part of the weight of the trailer conventionally rests through the drawbar eye on the longitudinal support of the drawbar.

In order to optimally utilize the often limited space at the rear of the vehicle, the attachment can also be arranged beneath the longitudinal support, as a result of which a part of the weight of the trailer rests via the drawbar eye on the attachment.

It is disadvantageous that the connection between attachment and longitudinal support can thus be broken, which leads to a sudden disconnection of the load. Such an uncontrolled disconnection of the load represents a considerable hazard.

SUMMARY OF THE INVENTION

It is therefore the object of the invention to provide a drawbar of the kind mentioned above with which the aforementioned disadvantages can be avoided and which offers high security against undesirable disconnection of the load.

This is achieved in accordance with the invention by a drawbar for a tractor vehicle, including a longitudinal support and an attachment which is releasable fastened to the longitudinal support, wherein the longitudinal support and the attachment form a drawbar eye receiver and respectively include a receiving opening for a coupling pin, wherein the attachment includes at least one tilting protrusion, and the at least one tilting protrusion is arranged in a recess of the longitudinal support in a self-locking manner against a lifting force in the direction of the central line of the coupling pin.

This leads to the advantage that the drawbar can thus be arranged in a space-saving manner on the rear of an agricultural tractor vehicle, in that the attachment can be arranged beneath the longitudinal support, and high mechanical security of the connection of attachment and longitudinal support can still be provided. In the case of an attachment arranged above the longitudinal support, lifting forces can also occur, either by improper loading of a trailer or an impact during the movement. In this case, the tilting protrusion in the recess becomes twisted if the attachment is pushed away from the longitudinal support by the weight acting on the drawbar eye, as a result of which the connecting means for the releasable fastening of the attachment on the longitudinal support are relieved. It is a further advantage that prior to the tearing of the connecting means and a resulting total failure a plastic deformation area of the attachment occurs, which can be determined prior to total failure. As a result of the simple configuration with a tilting protrusion, the drawbar can be arranged in an especially simple manner. Furthermore, the tilting protrusion offers the advantage that the attachment can be removed easily for maintenance purposes without the lifting force in the direction of the central line of the coupling pin.

The invention further relates to a tractor vehicle.

The invention further relates to an attachment for a drawbar.

The dependent claims relate to further advantageous embodiments of the invention.

Express reference is hereby made to the wording of the claims, as a result of which the claims are inserted into the description at this point by reference and apply as reproduced literally.

BRIEF DESCRIPTION OF THE DRAWING

The invention will be described below in closer detail by reference to the enclosed drawings which merely show a preferred embodiment by way of example, wherein:

FIG. 1 shows an especially preferred embodiment of the drawbar in an axonometric view;

FIG. 2 shows an attachment for the especially preferred embodiment of the drawbar in FIG. 1 in an axonometric view, and FIG. 3 shows the attachment of FIG. 2 from a different perspective.

DETAILED DESCRIPTION OF PREFERRED EMBODIMENTS

FIGS. 1 to 3 show at least parts of an especially preferred embodiment of a drawbar 1 for a tractor vehicle, comprising a longitudinal support 2 and an attachment 3 which is releasably fixed to the longitudinal support 2, wherein the longitudinal support 2 and the attachment 3 form a drawbar eye receiver 4 and respectively comprise a receiving opening 5 for a coupling pin. A drawbar 1 is a hitch apparatus which can be used especially for hitching simple agricultural trailers by means of a so-called bottom hitch.

The drawbar 1 comprises a longitudinal support 2, which can especially be rod-shaped. In this case, the longitudinal support 2 can have a fixed length. It can alternatively be provided that the longitudinal support 2 is adjustable in its length. The cross-section of the longitudinal support 2 can especially be rectangular.

Furthermore, the longitudinal support 2 can comprise a fastening apparatus, with which the longitudinal support 2 can be attached in a horizontally pivotable manner to the rear of a tractor vehicle.

Furthermore, the longitudinal support 2 and the attachment 3 can be formed to comprise metal, especially steel.

The longitudinal support 2 and the attachment form an especially claw-shaped drawbar eye receiver, in which drawbar eye receiver a drawbar eye can be arranged. The longitudinal support 2 and the attachment 3 respectively comprising a receiving opening 5 for a coupling pin P, wherein these two receiving openings 5 can be especially arranged in alignment. The coupling pin P can be pushed through the drawbar eye receiver 4 via the receiving openings 5 in order to movably fasten a drawbar eye in the drawbar receiver 4.

It is provided that the attachment 3 comprises at least one tilting protrusion 6, and the at least one tilting protrusion 6 is arranged in a recess 7 of the longitudinal support 2 in a self-locking manner against a lifting force in the direction of the central line of the coupling pin. The tilting protrusion 6 can especially be a protrusion which is integrally formed on the attachment 3 and which—when the attachment 3 is fixed to the longitudinal support 2—engages in a recess 7 of the longitudinal support. The recess 7 can be arranged especially in a diametrically opposed manner to the tilting protrusion 6. If the attachment 3 is arranged in the operating position beneath the longitudinal support 2 and a drawbar eye is arranged in the drawbar eye receiver 4 and exerts a lifting force on the attachment 3 in the direction of the central line of the coupling pin as a result of the weight, a torque is produced on the tilting protrusion 6 by means of which the tilting protrusion 6 is wedged in the recess 7 and is thus arranged in a self-locking manner for the duration of the action of the lifting force. The advantages described in the introduction to the description can thus be achieved.

FIGS. 2 and 3 show an attachment 3 for the especially preferred embodiment of a drawbar 1, wherein the attachment 3 can releasably be fastened to the longitudinal support 2 for forming the drawbar eye receiver 4 and comprises a receiving opening 5 for the coupling pin, wherein the attachment 3 comprises at least one tilting protrusion 6, and the at least one tilting protrusion 6 can be arranged in the recess 7 of the longitudinal support 2 in a self-locking manner against the lifting force in the direction of the central line of a coupling pin.

Furthermore, a tractor vehicle with an advantageously arranged drawbar 1 can be provided, wherein the attachment 3 is arranged beneath the longitudinal support 2 in the operating position of the tractor vehicle. FIG. 1 would represent a view from below in the operating position of the tractor vehicle. The drawbar 1 can especially be fixed in a horizontally pivotable manner on the tractor vehicle. The tractor vehicle could further especially be an agricultural tractor vehicle, and more preferably a tractor.

According to the especially preferred embodiment in FIGS. 1 to 3, precisely one tilting protrusion 6 can be provided. Alternatively, a plurality of tilting protrusions 6 can also be provided.

It can be provided in an especially preferred way that a first connecting means receiver 8 leads to the releasable fastening of the attachment 3 on the longitudinal support 2 by the at least one tilting protrusion 6. The first connecting means receiver 8 can especially be a breakthrough, more preferably a hole, which leads through the attachment 3 and the longitudinal support 2. A connecting means such as a screw or a bolt can be guided through the first connecting means receiver 8, which connecting means releasably fastens the attachment 3 and the longitudinal support to each other. The action of force on the connecting means can be reduced considerably by the arrangement of the connecting means receiver 8, and thus also the connecting means, by the tilting protrusion 6, because the lifting forces in this region are absorbed by the tilting protrusion 6 and the receiver 7.

It can further preferably be provided that the first connecting means receiver 8 is arranged between the receiving opening 5 of the attachment 3 and a second connecting means receiver 9. In other words, it can especially be provided that a first connecting means receiver 8 leads through the tilting protrusion 6 from two connecting means receivers 8, 9, and that of the two connecting means receivers 8, 9 the first connecting means receiver is arranged closer to the receiving openings 5, i.e. close to the drawbar eye receiver 4. The second connecting means receiver 9 can especially be a breakthrough, more preferably a hole, which leads through the attachment 3 and the longitudinal support 2. A further connecting means such as a screw or a bolt can be guided through the second connecting means receiver 9, which further connecting means also releasably fastens the attachment 3 and the longitudinal support 2 to each other. The tilting protrusion 6 and the receiver 7 absorb a major part of the lifting forces of the attachment 3, as a result of which the action of force on the second connecting means receiver 9, which is arranged on the side of the tilting protrusion 6 which faces away from the action of force, can also be reduced.

It can be provided according to an embodiment (not shown) that the second connecting means receiver 9 leads to the releasable fastening of the attachment 3 on the longitudinal support 2 by a further tilting protrusion 6. In other words, both connecting means receivers 8, 9 lead through the tilting protrusions 6.

It can be provided in an especially preferred way that the at least one tilting protrusion 6 is arranged as a sleeve which is especially substantially shaped in the form of a hollow cylinder. An especially advantageous and constant distribution of tension can thus be achieved under loading by means of a lifting force in the direction of the central line of the coupling pin.

The tilting protrusion 6 can especially have a circular-cylindrical outer jacket surface.

Alternatively, the tilting protrusion 6 can comprise an outer jacket surface with a polygonal layout, especially a regular hexagon or a regular octagon.

It can further especially be provided that the longitudinal support 2 is offset in the direction of the attachment 3. This means that the longitudinal support is bent at first in the direction of the attachment 3 and subsequently extends in parallel again to the original progression. It can be provided in an especially preferred manner that the longitudinal support 2 comprises a first section 12, an offset section 10 and a second section 11, the attachment 3 is fastened to the first section 12, and the fastening apparatus is arranged on the second section 11. An axis of the second section 11 can especially extend through the drawbar eye receiver 4. As a result, mechanical loading by torques acting on the fastening apparatus can be kept at a low level. Only the section 12 and the offset region 10 of the support 2 are shown completely in FIG. 1.

What is claimed is:
1. A drawbar for a tractor vehicle, comprising:
a longitudinal support having a longitudinal portion provided with a receiving opening; and an attachment releasably fastened to the longitudinal support, said attachment having a longitudinal portion which extends along the longitudinal portion of the longitudinal support and is transversely spaced from the longitudinal portion of the longitudinal support forming a drawbar eye receiver therebetween, said longitudinal portion of said attachment having a receiving opening in alignment with the receiving opening of the longitudinal portion of the longitudinal support for receiving a coupling pin, and said attachment having a transverse portion which extends transversely from the longitudinal portion of said attachment towards the longitudinal support and is provided with at least one tilting protrusion formed integrally with said attachment and wedged in a recess of the longitudinal portion of the longitudinal support in a self-locking manner against a lifting force in a direction of a central line of the coupling pin, wherein the at least one tilting protrusion is configured as a sleeve which is substantially shaped in the form of a hollow cylinder.

2. The drawbar of claim 1, further comprising a first connecting means receiver configured to releasably fasten the attachment to the longitudinal support and sized to lead through the at least one tilting protrusion.

3. The drawbar of claim 2, further comprising a second connecting means receiver, said first connecting means receiver being arranged between the receiving opening of the attachment and the second connecting means receiver.

4. The drawbar of claim 1, wherein the longitudinal support is offset in a direction of the attachment.

5. A tractor vehicle, comprising a drawbar including a longitudinal support having a longitudinal portion provided with a receiving opening, and an attachment releasably fastened to the longitudinal support, said attachment having a longitudinal portion which extends along the longitudinal portion of the longitudinal support and is transversely spaced from the longitudinal portion of the longitudinal support forming a drawbar eye receiver therebetween, said longitudinal portion of said attachment having a receiving opening in alignment with the receiving opening of the longitudinal portion of the longitudinal support for receiving a coupling pin, and said attachment having a transverse portion which extends transversely from the longitudinal portion of said attachment towards the longitudinal support and is provided with at least one tilting protrusion formed integrally with said attachment and wedged in a recess of the longitudinal portion of the longitudinal support in a self-locking manner against a lifting force in a direction of a central line of the coupling pin, said attachment being arranged beneath the longitudinal support in an operating position of the tractor vehicle, wherein the at least one tilting protrusion is configured as a sleeve which is substantially shaped in the form of a hollow cylinder.

6. The tractor vehicle of claim 5, wherein the drawbar includes a first connecting means receiver configured to releasably fasten the attachment to the longitudinal support and sized to lead through the at least one tilting protrusion.

7. The tractor vehicle of claim 6, wherein the drawbar includes a second connecting means receiver, said first connecting means receiver being arranged between the receiving opening of the attachment and the second connecting means receiver.

8. The tractor vehicle of claim 5, wherein the longitudinal support is offset in a direction of the attachment.

9. An attachment for a drawbar for a tractor vehicle-including a longitudinal support having a longitudinal portion provided with a receiving opening, and an attachment releasably fastened to the longitudinal support, said attachment having a longitudinal portion which extends along the longitudinal portion of the longitudinal support and is transversely spaced from the longitudinal portion of the longitudinal support forming a drawbar eye receiver therebetween, said longitudinal portion of said attachment having a receiving opening in alignment with the receiving opening of the longitudinal portion of the longitudinal support for receiving a coupling pin, and said attachment having a transverse portion which extends transversely from the longitudinal portion of said attachment towards the longitudinal support and is provided with at least one tilting protrusion formed integrally with said attachment and wedged in a recess of the longitudinal portion of the longitudinal support in a self-locking manner against a lifting force in a direction of a central line of the coupling pin, said attachment being arranged beneath the longitudinal support in an operating position of the tractor vehicle, wherein the at least one tilting protrusion is configured as a sleeve which is substantially shaped in the form of a hollow cylinder.

* * * * *